United States Patent
Mehaffy et al.

(10) Patent No.: US 8,225,327 B2
(45) Date of Patent: Jul. 17, 2012

(54) SYNCHRONIZING ACCESS TO A SHARED RESOURCE UTILIZING SELECTIVE LOCKING

(75) Inventors: David W. Mehaffy, Austin, TX (US); Greg R. Mewhinney, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1422 days.

(21) Appl. No.: 11/227,032

(22) Filed: Sep. 15, 2005

(65) Prior Publication Data

US 2007/0061810 A1 Mar. 15, 2007

(51) Int. Cl.
*G06F 9/46* (2006.01)
*G06F 9/45* (2006.01)
*G06F 17/00* (2006.01)

(52) U.S. Cl. ........ 718/108; 717/147; 717/148; 707/704; 718/107

(58) Field of Classification Search .......... 718/108; 710/260; 709/201; 711/100
See application file for complete search history.

(56) References Cited

U.S. PATENT DOCUMENTS

| | | | |
|---|---|---|---|
| 5,305,455 A | | 4/1994 | Anschuetz et al. |
| 5,339,427 A | | 8/1994 | Elko et al. |
| 5,410,695 A | | 4/1995 | Frey et al. |
| 5,442,763 A | * | 8/1995 | Bartfai et al. ............. 711/145 |
| 5,537,574 A | * | 7/1996 | Elko et al. ............... 711/141 |
| 5,551,046 A | * | 8/1996 | Mohan et al. ............. 707/8 |
| 5,644,709 A | * | 7/1997 | Austin ..................... 714/53 |
| 5,742,785 A | * | 4/1998 | Stone et al. .............. 712/217 |
| 5,742,830 A | | 4/1998 | Elko et al. |
| 5,928,334 A | * | 7/1999 | Mandyam et al. ......... 709/248 |
| 5,991,845 A | * | 11/1999 | Bohannon et al. ......... 710/200 |
| 6,047,295 A | * | 4/2000 | Endicott et al. ........... 1/1 |
| 6,049,867 A | | 4/2000 | Eickemeyer et al. |
| 6,145,061 A | * | 11/2000 | Garcia et al. ............. 711/154 |
| 6,247,025 B1 | * | 6/2001 | Bacon ..................... 707/206 |
| 6,285,974 B1 | * | 9/2001 | Mandyam et al. ........... 703/13 |
| 6,298,436 B1 | * | 10/2001 | Kahle et al. ............... 712/220 |
| 6,408,305 B1 | * | 6/2002 | Stoodley ................... 1/1 |
| 6,553,443 B1 | * | 4/2003 | Baqai et al. ............... 710/264 |
| 6,636,874 B1 | * | 10/2003 | Douceur et al. ........... 1/1 |
| 6,651,146 B1 | | 11/2003 | Srinivas et al. |
| 6,826,752 B1 | | 11/2004 | Thornley et al. |
| 6,886,064 B2 | * | 4/2005 | Dawkins et al. .......... 710/200 |
| 6,996,590 B2 | * | 2/2006 | Borman et al. ........... 707/206 |
| 7,194,495 B2 | * | 3/2007 | Moir et al. ................ 707/610 |
| 7,299,242 B2 | * | 11/2007 | Moir et al. ............... 707/103 Z |
| 7,844,758 B1 | * | 11/2010 | Hughes .................... 710/39 |
| 2002/0029800 A1 | * | 3/2002 | West ........................ 137/100 |
| 2004/0054518 A1 | * | 3/2004 | Altman et al. ............ 703/27 |
| 2004/0168037 A1 | * | 8/2004 | Dearth et al. ............. 711/173 |
| 2004/0240388 A1 | * | 12/2004 | Albion et al. ............. 370/252 |
| 2004/0264367 A1 | * | 12/2004 | Edwards .................. 370/229 |
| 2005/0149903 A1 | * | 7/2005 | Archambault et al. ..... 717/100 |
| 2006/0218556 A1 | * | 9/2006 | Nemirovsky et al. ...... 718/104 |

* cited by examiner

*Primary Examiner* — Emerson Puente
*Assistant Examiner* — Adam Lee
(74) *Attorney, Agent, or Firm* — Yudell Isidore Ng Russell PLLC

(57) ABSTRACT

A method and system for providing access to a shared resource utilizing selective locking are disclosed. According to one embodiment, a method is provided comprising receiving a request to perform a resource access operation on a shared resource, invoking a first routine to perform the resource access operation, detecting a data processing system exception generated in response to invoking the first routine, and invoking a second routine to perform the resource access operation in response to such detecting. In the described embodiment, the first routine comprises a dereference instruction to dereference a pointer to memory associated with the shared resource, the second routine comprises a lock acquisition instruction to acquire a global lock associated with the shared resource prior to a performance of the resource access operation and a lock release instruction to release the global lock once resource access operation has been performed.

14 Claims, 5 Drawing Sheets

SYNCHRONIZING ACCESS TO A SHARED RESOURCE UTILIZING SELECTIVE LOCKING

BACKGROUND

1. Technical Field

Embodiments of the present invention relate generally to shared resource access and more particularly to a method and system for providing access to a shared resource within a data processing system utilizing selective locking.

2. Description of the Related Art

As data processing systems have become more pervasive and complex, utilization of shared resources (i.e., resources which are commonly visible, accessible, useable, or the like among data processing systems and/or components thereof) has increased. Shared resources may be utilized to enable communication among systems or system elements, reduce and/or distribute data processing system component costs, and/or to increase the speed with which data processing may be performed. Shared resources are particularly useful in data processing systems comprising multiple processing elements operating in parallel.

A processing element is a data processing system component which may be implemented in hardware (e.g., as a general or special-purpose processor or processor core, a programmable logic device, or the like), firmware, software, or a combination thereof. Software processing elements may include any of a number of components such as processes or threads within a multithreading data processing system. In such a multithreading system, each application is partitioned among one or more processes with each process being associated with an address space, such that different processes can operate concurrently without resource conflicts. Each process in turn includes one or more threads of control, or "threads." A thread is a unit or path of execution within an associated or "parent" process. Each process' threads share a common address space, thus simplifying inter-thread communication and reducing context switch time between threads as compared to that between processes or applications.

While providing a number of benefits, sharing a resource among multiple processing elements may present a number of challenges. Coordination of access to a shared resource to ensure consistency of the resource's state and to avoid data processing system exceptions (e.g., faults, traps, aborts, or the like) is one such challenge prevalent with modern data processing systems. Processing element synchronization is particularly important among threads of a multithreading data processing system as such processing elements may operate effectively simultaneously with one another and be stopped or started at any time during operation. Such simultaneous operation and intermittent blocking may lead to unstable execution (e.g., livelock, deadlock, or the like).

Consequently, conventional multithreaded programming strives to make execution sequences (e.g., routines, functions, procedures, stubs, or the like) which are "thread-safe" and reentrant utilizing programming techniques and thread synchronization tools. A synchronization tool may include any logical or physical element used to coordinate or synchronize the operation of two or more processing elements. In the multithreading data processing system context, such synchronization tools may include interlocked functions, critical sections, synchronization kernel objects (e.g., mutual exclusion objects (mutexes) and semaphores), events, or the like.

One exemplary shared resource which has presented particular difficulty in the multithreading data processing system context is the list data structure (e.g., a singly-linked list, queue, stack, or the like). A typical list data structure (e.g., a stack) includes a head pointer or reference indicating the first element or "node" of the list. Each element of the list in turn includes a pointer or reference to the next element such that, using the head pointer or "anchor" all elements of the list may be accessed sequentially. A list element may be removed utilizing a conventional execution sequence in which a reference to the first list element is associated, via a first load operation, with a first variable, a reference to the second list element is associated, via a second load operation utilizing the reference to the first list element, with a second variable, and the first list element is then re-identified within the second list element via a store operation of the second variable's reference value.

In a multithreading data processing system environment, the above-described technique for list element removal suffers from a number of shortcomings. For example, where separate threads are utilized to perform the element removal execution sequence and a corresponding element addition sequence or routine, the list data structure may become corrupted. To avoid such list corruption, multithreading data processing systems have more-recently begun providing interlocked function-type synchronization tools. For example, the linked "load and reserve" (LAR) and "store conditional" (STC) instructions provided as part of the PowerPC™ Processor Architecture by International Business Machines Corporation of Armonk, N.Y., allow a value or variable to be atomically manipulated without requiring a prohibitive amount of time or system resources. By supplanting the first load operation and store operation described above with LAR and STC instructions, respectively, a race condition and possible system error may be avoided in most circumstances.

While avoiding the corruption of an associated list data structure, the use of such interlocked (e.g., LAR and STC) functions does not preclude all system exceptions. For example, freed or "reclaimed" storage (e.g., system memory) may be dereferenced in a scenario where two distinct threads perform the above-described element removal execution sequence including interlocked functions. A first thread and a second thread may both obtain a pointer or reference to the first list element, via a LAR operation. Thereafter, the first thread may complete the element removal execution sequence and free storage associated with the removed list element. When the second thread subsequently attempts to dereference the obtained pointer, an exception (e.g., a page fault) may occur, disabling the data processing system within which the threads exist.

To avoid the occurrence of data processing system exceptions brought on by multithreaded programming, a global lock synchronization tool may be used. Serialization of list data structure operations using a global lock is frequently too burdensome however, potentially causing memory delay, path length, and concurrency penalties. Such a burden is frequently prohibitive, particularly since the frequency with which a removed list item's associated storage is reclaimed is relatively small compared to the total number of list operations typically performed.

SUMMARY

A method and system for providing access to a shared resource within a data processing system utilizing selective locking are provided herein. According to one embodiment, a method is provided comprising receiving a request to perform a resource access operation on a shared resource, invoking a first routine to perform the resource access operation, detecting a data processing system exception generated in response to invoking the first routine, and invoking a second routine to perform the resource access operation in response to such detecting. In the described embodiment, the first routine comprises a dereference instruction to dereference a pointer to memory associated with the shared resource, the second routine comprises a lock acquisition instruction to acquire a global lock associated with the shared resource prior to a performance of the resource access operation and a lock release instruction to release the global lock once resource access operation has been performed The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

Figure 1:
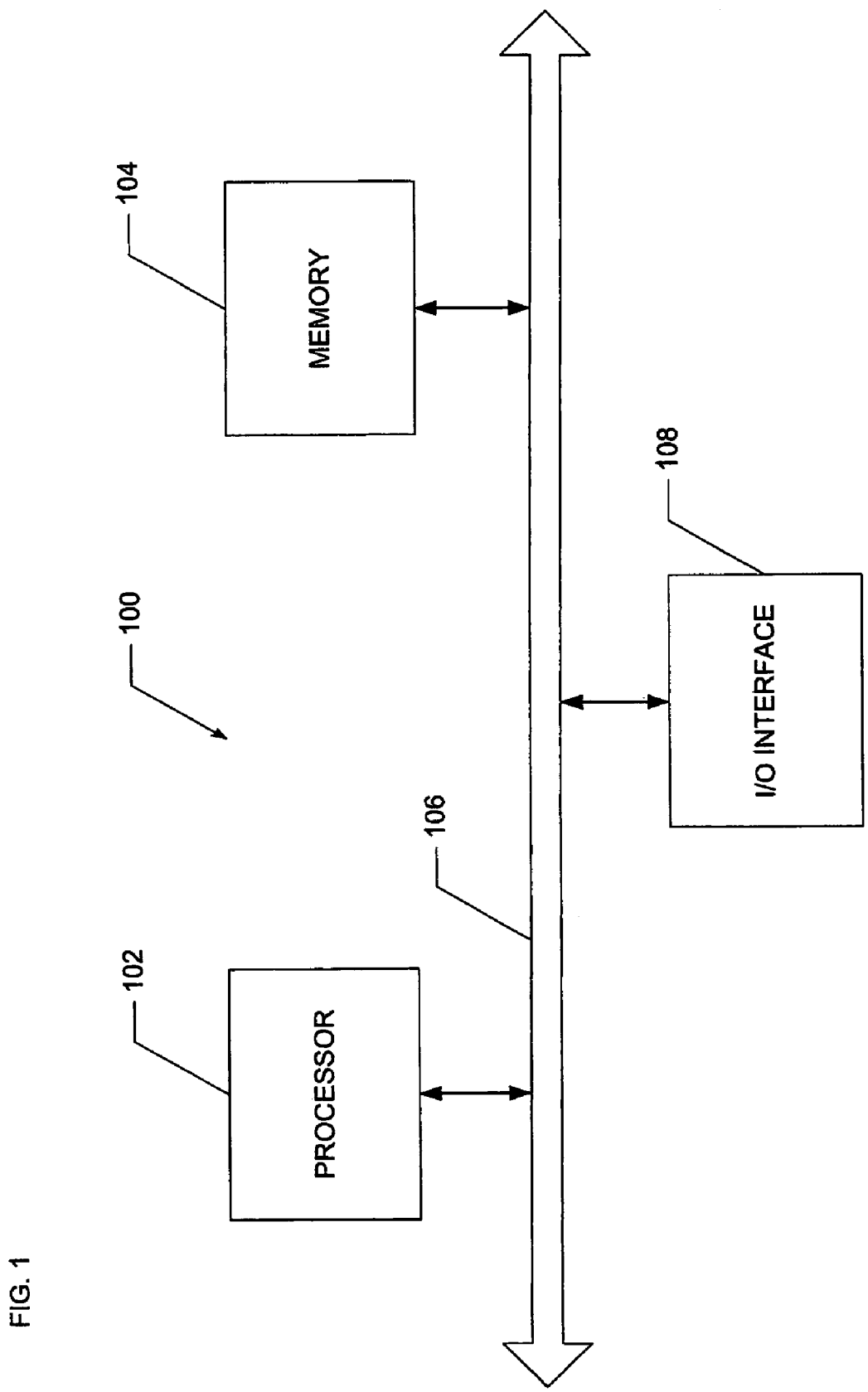
FIG. 1 illustrates a high-level internal block diagram of a data processing system according to an embodiment of the present invention.

DETAILED DESCRIPTION OF AN
ILLUSTRATIVE EMBODIMENT

The following sets forth a detailed description of at least the best-contemplated mode for carrying out the one or more systems, devices and/or processes described herein. The description is intended to be illustrative and should not be taken to be limiting. In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements may be described which are applicable to some embodiments but not other embodiments.

Embodiments of the present invention provide a method and system for providing access to a shared resource utilizing selective locking. More specifically, within one or more embodiments of the present invention, a global lock synchronization tool or component is utilized only in response to a selected stimulus or event (e.g., the dereferencing of a pointer to memory which has been previously deallocated or "freed" from within a predetermined routine configured to perform a resource access operation on the shared resource. Consequently, processing overhead (e.g., memory delay, pathlength, and concurrency penalties) may be reduced where a significant proportion of accesses do not involve the dereferencing of deallocated memory while still providing the capability to contend with such dereferencing without catastrophic results.

Embodiments of the present invention may be implemented in tandem with one or more existing synchronization tools or techniques. For example, in one embodiment, a global lock synchronization tool or object is used selectively in addition to an interlocked function-type synchronization tool (e.g., a load-and-reserve and store-conditional instruction pair). Accordingly, the use of synchronization techniques may be more specifically tailored to the particular resource access operations requested and operating environment. Data processing system storage (e.g., memory) may therefore be reclaimed utilizing embodiments of the present invention without the need for a complex arbitration or serialization scheme or the performance penalties associated coarse-granularity (e.g., global) synchronization tools.

Embodiments of the present invention enable the management of a shared resource (e.g., a list data structure) where memory associated with the shared resource may be reclaimed while providing performance comparable to the management of a resource for which such reclamation is prohibited. Such shared resource management may be particularly useful in some embodiments of the present invention in which a resource is shared among a plurality of thread processing elements within a multithreading data processing system.

FIG. 1 illustrates a high-level internal block diagram of a data processing system according to an embodiment of the present invention. While a particular number and arrangement of elements have been illustrated with respect to data processing system 100 of FIG. 1, it should be appreciated that embodiments of the present invention are not limited to data processing systems having any particular number, type, or arrangement of components and so many encompass a wide variety of data processing system types, architectures, and form factors (e.g., network elements or nodes, personal computers, workstations, servers, or the like). Data processing system 100 of the illustrated embodiment includes a processor 102 coupled to a memory 104 utilizing a bus 106. Memory 104 may comprise any of a number of system memory-type storage elements such as random access memory (RAM), read-only memory (ROM), flash memory, and cache.

Data processing system 100 of the illustrated embodiment further comprises an input/output (I/O) interface 108 coupled to bus 106 to communicatively couple one or more I/O devices (not shown) to data processing system 100. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, information processing hardware, and various processing operations further described herein. The features and process operations of the present invention may be embodied in executable instructions embodied within a machine-readable medium such as memory 104, a storage device, a communication device or medium, or the like.

A machine-readable medium may include any mechanism that provides (i.e., stores and/or transmits) data in a form readable by a machine (e.g., data processing system 100). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like.

The described executable instructions can be used to cause a general or special purpose processor such as processor 102, programmed with the instructions, to perform operations, methods or processes of the present invention. Alternatively, the features or operations of the present invention may be performed by specific hardware components that contain hard-wired logic for performing the operations, or by any combination of programmed data processing components and custom hardware components.

Figure 2:
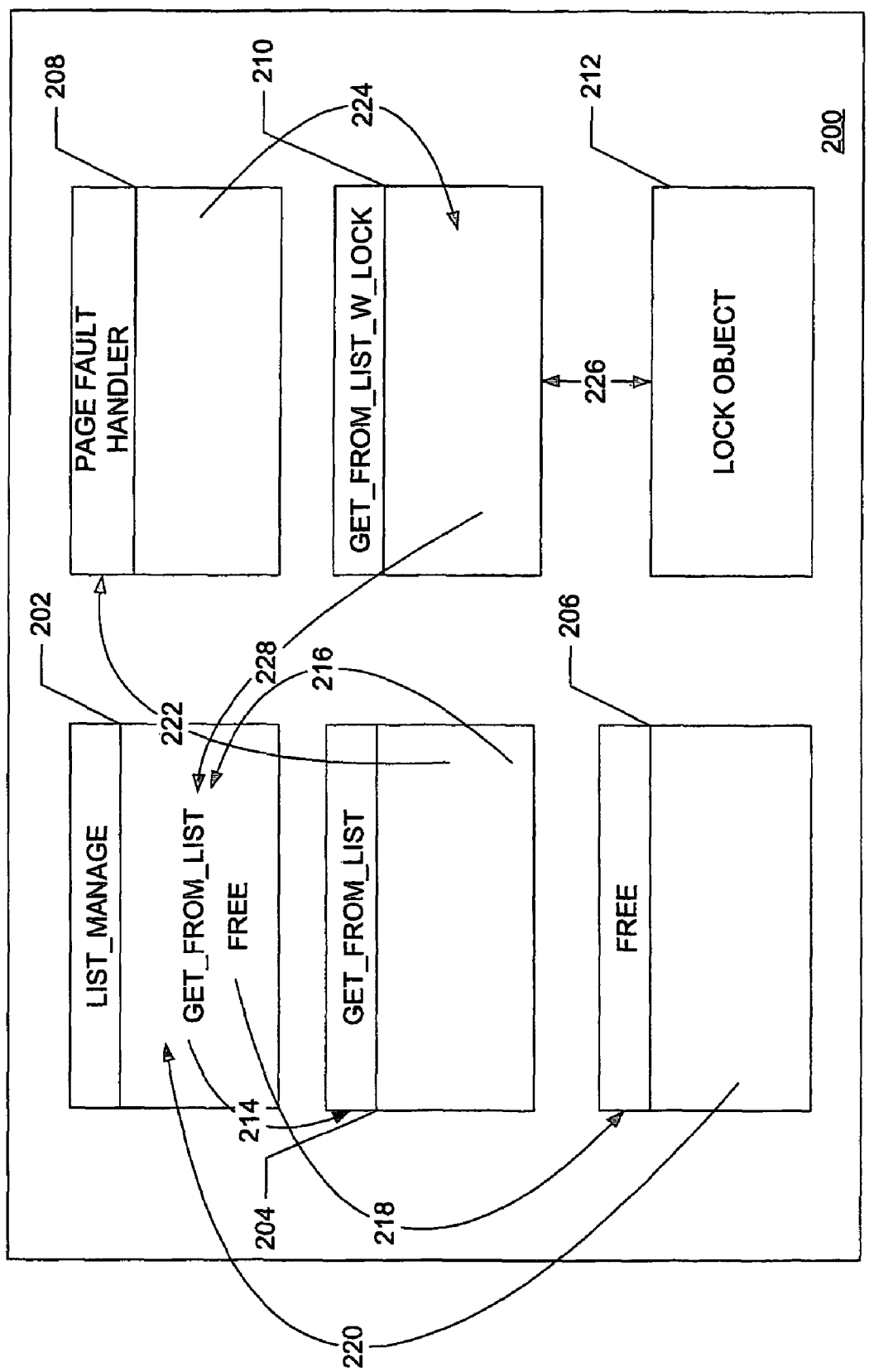
FIG. 2 illustrates an address space of a data processing system configured to provide access to a shared resource utilizing selective locking according to an embodiment of the present invention.

FIG. 2 illustrates an address space of a data processing system configured to provide access to a shared resource utilizing selective locking according to an embodiment of the present invention. Within the depicted address space 200, a number of components may be stored. In the illustrated embodiment, such components include a list management routine 202, a non-global-locking version of a list data structure element removal routine (e.g., get from list routine 204), a memory deallocation routine (e.g., free memory routine 206), an exception handler (e.g., page fault handler 208), a global-locking version of a list data structure element removal routine (e.g., get from list with lock routine 210), and a synchronization element (e.g., global lock object 212). According to one embodiment, address space 200 may comprise an address space or a portion thereof of a processing element (e.g., a process or thread) within a multi-threading data processing system.

Each routine within address space 200 may include calls or references to other routines or functions which cause the referenced or called execution sequence to be invoked. For example, in the illustrated embodiment of FIG. 2, list management routine 202 includes calls to get from list routine 204 as well as free memory routine 206. Transitions or other interactions between components of address space 200 may be prompted by other events (e.g., the occurrence or detection of an exception) as will be described in greater detail herein.

According to one embodiment of the present invention, list management routine 202 is initially executed in a sequential manner utilizing a current thread. Such execution results in the invocation of and transition to get from list routine 204 as illustrated by arrow 214. In a majority of instances, such an invocation will cause an execution of get from list routine 204 to remove a list data structure element followed by a return to list management routine 202 as illustrated by arrow 216. Thereafter, execution of list management routine 202 may proceed sequentially, resulting in the invocation of free memory routine 206 as illustrated by arrow 218 and return as shown by arrow 220. In one embodiment, the previously-described execution progression is performed within the context of a first thread of a multithreading data processing system.

In the described embodiment, a second thread may execute within address space 200 subsequent to (or potentially partially in parallel with) the execution of the described first thread. Via such a second thread, list management routine 202 may be initially executed resulting in an invocation of get from list routine 204 (arrow 214) as previously described herein. If get from list routine 204 includes the resolution or dereferencing of a pointer or reference to access a stored data element which has been deallocated by the previous execution of free memory routine 206 via the first thread, an exception or "fault" may be generated causing a transition to page fault handler 208 as illustrated by arrow 222, rather than the previously-described execution progression (e.g., a return and sequential execution of list management routine 202).

If page fault handler 208 is entered under predetermined circumstances (e.g., via an exception generated during the execution of get from list routine 204) a modified (e.g., global-locking) version of a list data structure element removal routine, get from list with lock routine 210, is entered as indicated by arrow 224. Although the transition to get from list with lock routine 210 has been depicted as occurring without an explicit call or invocation since no conventional return from such a call would typically be performed, in alternative embodiments of the present invention such explicit calls may be made. In the illustrated embodiment, get from list with lock routine 210 is executed atomically utilizing global lock object 212. Global lock object 212 is acquired and released via interaction or an interface as indicated by arrow 226.

In an alternative embodiment of the present invention, global lock object is also utilized to serialize the execution of get from list with lock routine 210 with free memory routine 206. Although not depicted in the embodiment of FIG. 2, in the described alternative embodiment, free memory routine 206 may interact with global lock object 212 in a similar manner to that shown by arrow 226. Once the execution of get from list with lock routine 210 has completed, the execution progression of the described second thread may proceed (back) to list management routine 202 at the point from which get from list routine 204 was originally invoked as indicated by arrow 228.

Figure 3:
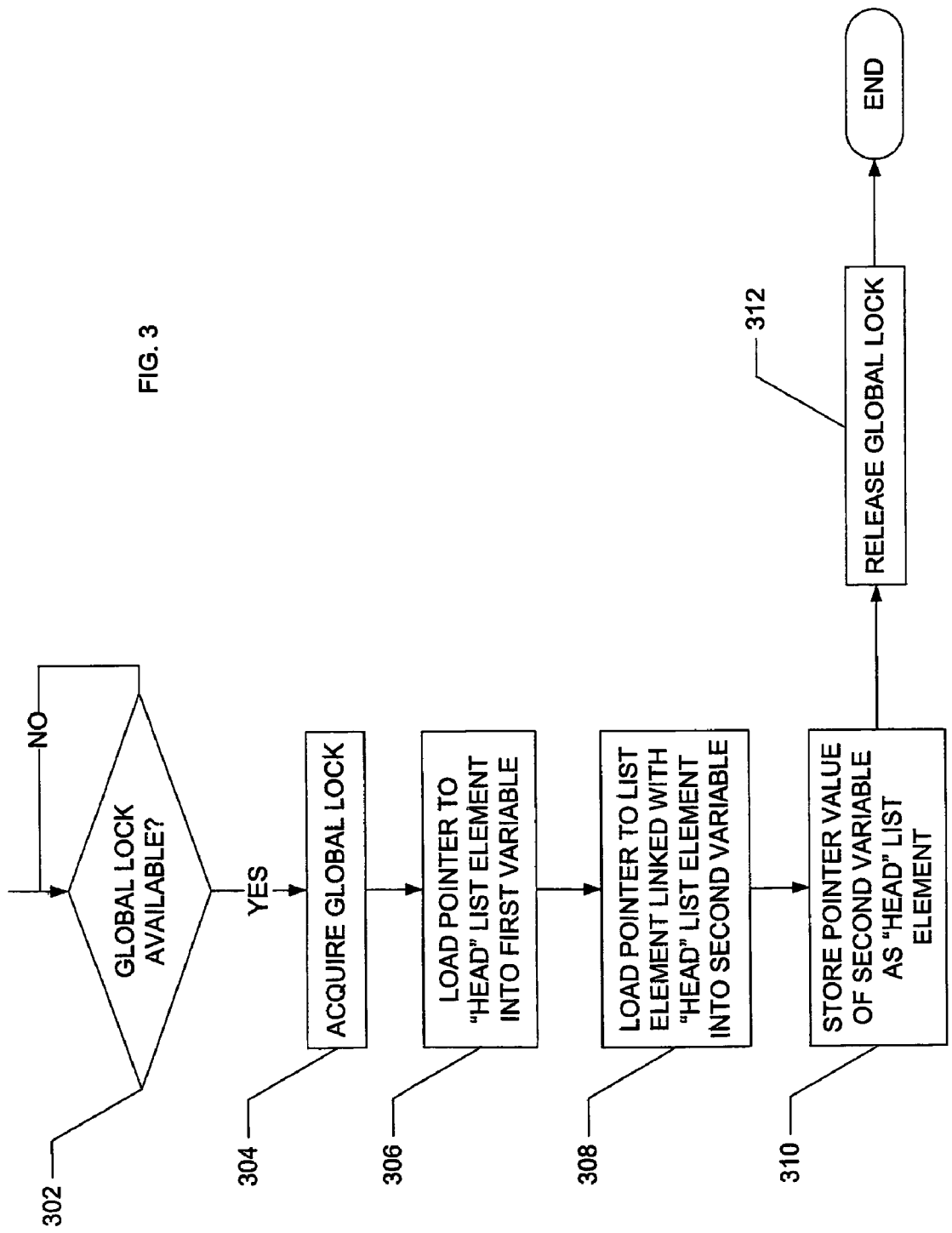
FIG. 3 illustrates a high-level flow diagram of selective global-locking list data structure element removal execution sequence according to an embodiment of the present invention.

FIG. 3 illustrates a high-level flow diagram of selective global-locking list data structure element removal execution sequence according to an embodiment of the present invention such as get from list with lock routine 210. While all presently-depicted embodiments are shown within the context of a singly-linked list data structure, alternative embodiments of the present invention may be utilized in conjunction with other types of list data structures (e.g., doubly-linked lists, arrays, or the like) or other shared resources. In the illustrated process embodiment, a determination is initially made whether or not a global lock object (e.g., global lock object 212) or other global synchronization element is available (process block 302). The depicted process then "spins" or blocks until the global lock object may be acquired (process block 304). While the assessment and acquisition of the described global lock object has been shown as occurring in separate operations, it should be appreciated that in one or more embodiments, such operations may be performed atomically via a single "test-and-set"-type operation.

Once the global lock object has been acquired, a pointer or reference to a "head" list element is loaded or otherwise associated with a first variable (process block 306). According to one embodiment, this load operation may be implemented utilizing a load-and-reserve instruction, previously-described herein. Thereafter, a pointer or reference to a list element which is linked (e.g., indicated by a "next element" pointer of) the identified "head" list element is loaded or otherwise associated with a second variable (process block 308).

Once pointers to both the first or "head" list element and another list element (e.g., the list element linked immediately adjacent to the head list element) within the list data structure are identified, the previous "head" list element may be removed from the list and the other list element identified as the new "head" or "anchor" of the list data structure via the storage of the pointer value of the second variable as the "head" list element (process block 310) as shown. According to one embodiment, the described storage operation may be implemented utilizing a store-conditional instruction, previously-described herein. The global lock object is then released (process block 312) before the depicted process is terminated.

Figure 4:
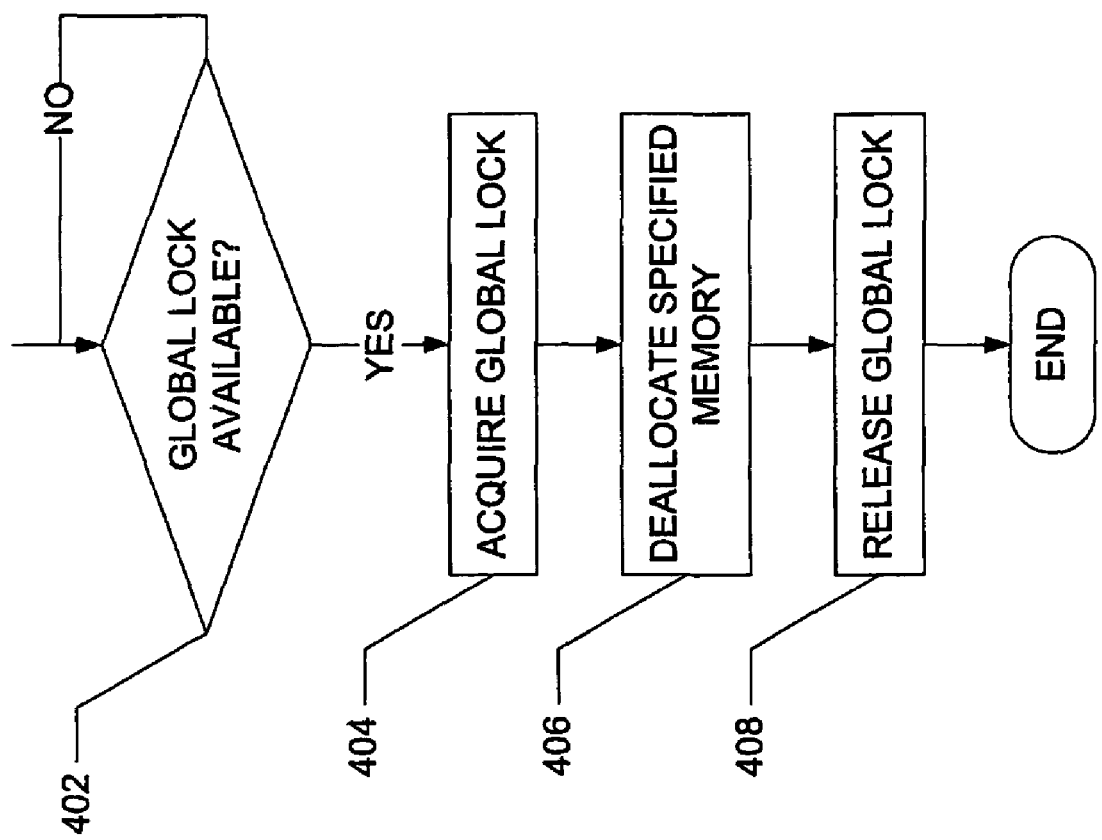
FIG. 4 illustrates a memory deallocation execution sequence according to an embodiment of the present invention.

FIG. 4 illustrates a memory deallocation execution sequence according to an embodiment of the present invention. In the illustrated process embodiment, the deallocation or "freeing" of memory is serialized with global-lock dependent list data structure element removal operations. More specifically, a similar determination is made whether a global lock object used to synchronize an associated global-locking list data structure element removal execution sequence is available (process block 402). Once available, the global lock object is acquired (process block 404) prior to the deallocation of specified memory (process block 406).

Thereafter, the global lock object is released (process block 408) following the completion of the requested memory deallocation as shown. It should be noted that in the illustrated embodiments of FIGS. 3-5, a global lock is taken unconditionally for all memory deallocations but only selectively (e.g., when previously-deallocated memory is dereferenced within a specific list data structure element removal execution sequence). Consequently, global lock synchronization is utilized less frequently as compared to conventional shared-resource data process system implementations.

Figure 5:
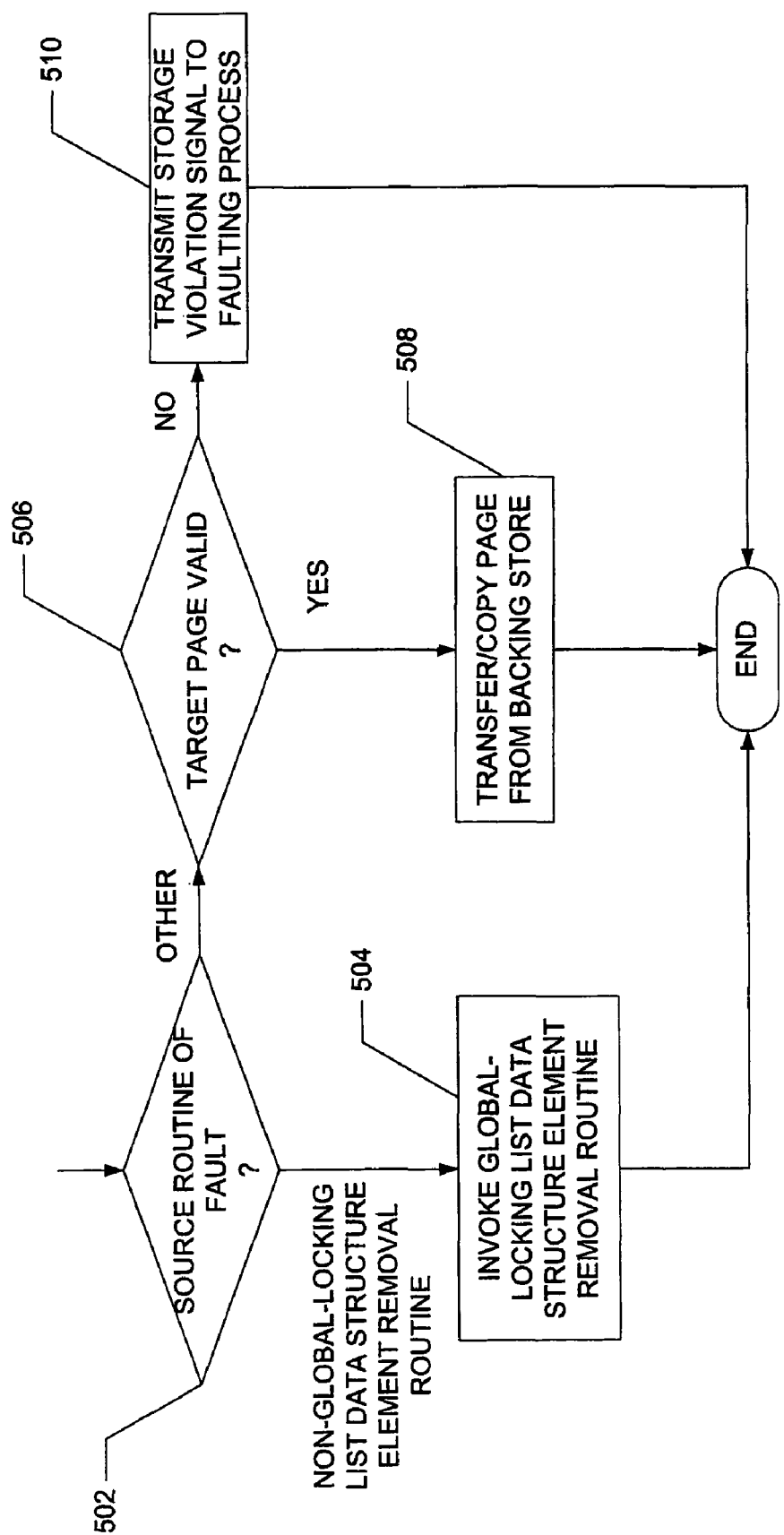
FIG. 5 illustrates a modified exception handler according to an embodiment of the present invention.

FIG. 5 illustrates a modified exception handler according to an embodiment of the present invention. In the illustrated embodiment, the source routine from which the page fault being serviced was generated is determined (process block 502). More specifically, in the illustrated embodiment, a determination is made whether the page fault to be serviced was generated within a predetermined non-global-locking list data structure element removal routine or execution sequence (e.g., get from list routine 204). If the source of the current page fault is determined to be the non-global-locking list data structure element removal routine, a global-locking list data structure element removal routine (e.g., get from list with lock routine 210) is invoked (process block 504).

According to one embodiment, the execution sequence of the predetermined non-global-locking list data structure element removal routine resides at a known or predetermined logical, virtual, or physical address or range of addresses within the address space of a data processing system kernel or operating system. The described determination may then be performed by comparing an address associated with the generated page fault (e.g., a prior instruction pointer value or value within an instruction queue or pipeline) with such known address or range of addresses.

If the page fault to be serviced was generated within a routine or execution sequence other than the non-global-locking list data structure element removal routine, a further determination is made whether the target page to be accessed is in fact valid (e.g., utilizing a page table or memory descriptor data structure) (process block 506). If the page to be accessed is determined to be valid, the page fault was most likely generated via the normal operation of demand paging. Consequently, the requested page of memory is then transferred or copied from backing store (e.g., disk or tape storage) into system memory (process block 508). If the page to be accessed is determined to be invalid however, the page fault may not be seamlessly resolved and a storage violation or other error signal is transmitted to the process from which the fault originated (process block 510). Although memory pages and page faults have been described with respect to FIG. 5 for the sake or clarity, alternative embodiments of the present invention may be practiced with memory or storage elements of other granularities utilized to store a shared data processing system resource or portion thereof as well as with other exceptions or exception types.

Although the flow diagrams depicted in FIGS. 3-5 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, addition process operations may be added where necessary in alternative embodiments of the present invention.

The present invention has been described in the context of fully functional data processing system; however, those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method for handling a shared list data structure within a multithreaded data processing system, said method comprising:
   in response to a receipt of a first request to dereference said shared list data structure having a plurality of list elements, invoking a non-global locking element removal routine to dereference said shared list data structure, wherein said non-global locking removal routine includes a dereference instruction to dereference a head pointer for said shared list data structure;
   in response to a receipt of a second request to dereference said shared list data structure, invoking said non-global locking element removal routine to dereference said shared list data structure and detecting a transition to a page fault handler due to said shared list data structure that has already been dereferenced by said first request; and
   in response to said transition to said page fault handler during the execution of said non-global locking element removal routine, invoking a global locking element removal routine to handle said second request, wherein said global locking element removal routine assigns a pointer linked to said head pointer as a new head pointer for said shared list data structure, and dereferences said shared list data structure by dereferencing said new head pointer.

2. The method of claim 1, wherein said shared list data structure is a double list data structure.

3. The method of claim 1, wherein said global locking element removal routine includes a deference instruction to dereference said new head pointer.

4. The method of claim 1, wherein said non-global locking element removal routine includes a load-and-reserve instruction and a store-conditional instruction utilized in combination to atomically access said head pointer for said shared list data structure.

5. The method of claim 1, wherein said non-global locking element removal routine includes a get_from_list routine.

6. The method of claim 1, wherein said global locking element removal routine includes a get_from_list_with_lock routine.

7. The method of claim 1, wherein said detecting further includes detecting for an occurrence of a memory page fault.

8. A non-transitory machine-readable medium having a computer program product for providing access to a shared resource within a multithreading data processing system, said machine-readable medium comprising:
   program code for, in response to a receipt of a first request to dereference said shared list data structure having a plurality of list elements, invoking a non-global locking element removal routine to dereference said shared list data structure, wherein said non-global locking removal routine includes a dereference instruction to dereference a head pointer for said shared list data structure;
   program code for, in response to a receipt of a second request to dereference said shared list data structure, invoking said non-global locking element removal routine to dereference said shared list data structure and detecting a transition to a page fault handler due to said shared list data structure that has already been dereferenced by said first request; and
   program code for, in response to said transition to said page fault handler during the execution of said non-global locking element removal routine, invoking a global locking element removal routine to handle said second request, wherein said global locking element removal routine assigns a pointer linked to said head pointer as a new head pointer for said shared list data structure, and dereferences said shared list data structure by dereferencing said new head pointer.

9. The non-transitory machine-readable medium of claim 8, wherein said shared list data structure is a double list data structure.

10. The non-transitory machine-readable of claim 8, wherein said global locking element removal routine includes a deference instruction to dereference said new head pointer.

11. The non-transitory machine-readable medium of claim 8, wherein said non-global locking element removal routine includes a load-and-reserve instruction and a store-conditional instruction utilized in combination to atomically access said head pointer for said shared list data structure.

12. The non-transitory machine-readable medium of claim 8, wherein said non-global locking element removal routine includes a get_from_list routine.

13. The non-transitory machine-readable medium of claim 8, wherein said global locking element removal routine includes a get_from_list_with_lock routine.

14. The non-transitory machine-readable medium of claim 8, wherein said program code for detecting further includes program code for detecting for an occurrence of a memory page fault.

* * * * *